UNITED STATES PATENT OFFICE.

GEORGE WRIGHT, OF BROOKLYN, NEW YORK.

FURNITURE-VARNISH.

SPECIFICATION forming part of Letters Patent No. 283,450, dated August 21, 1883.

Application filed October 24, 1882. (No specimens.)

*To all whom it may concern:*

Be it known that I, GEORGE WRIGHT, a citizen of the United States, residing in the city of Brooklyn, county of Kings, and State of New York, have invented a new and useful Furniture-Varnish, or Composition of Matter, to be used for finishing or polishing pianoforte cases, furniture, and other articles requiring a finely-finished surface, of which the following is a specification.

My composition consists of the following ingredients, combined in the proportions stated, viz: white dammar or other varnish, one-quarter gallon; mineral oil, three and one-half gallons; spirits of turpentine, one and one-quarter gallons; essential oil, commercially known as "lemon-grass," (*Andropogon citratus*,) five ounces. These ingredients are prepared as follows, viz: The mineral oil is passed through a filter to remove all heavy matter and impurities.

The above ingredients are to be thoroughly mingled by agitation.

In using the within-named composition it is applied to piano-forte cases, furniture, and other articles requiring a highly-finished surface, in the usual manner.

The object of my invention was to produce a composition that would make a perfect and durable finish, and requiring but little labor to apply it, and one that is free from offensive odor.

I am aware that various compounds have been made for a similar purpose, but I am not aware that all the ingredients of my composition in the proportions stated have been used together.

What I claim, and desire to secure by Letters Patent of the United States, is—

The within-described composition of matter to be used for finishing or polishing articles requiring a finely-finished surface, consisting of varnish, mineral oil, spirits of turpentine, and essential oil of lemon-grass, in the proportion specified.

GEORGE WRIGHT.

Witnesses:
S. T. McDOUGALL,
R. E. WIESE.